United States Patent
Yakovleva et al.

(10) Patent No.: US 8,021,496 B2
(45) Date of Patent: Sep. 20, 2011

(54) STABILIZED LITHIUM METAL POWDER FOR LI-ION APPLICATION, COMPOSITION AND PROCESS

(75) Inventors: Marina Yakovleva, Gastonia, NC (US); Yuan Gao, Monroe, NJ (US); Yangxing Li, Belmont, NC (US)

(73) Assignee: FMC Corporation, Philadelphia, PA (US)

( * ) Notice: Subject to any disclaimer, the term of this patent is extended or adjusted under 35 U.S.C. 154(b) by 629 days.

(21) Appl. No.: 12/152,212

(22) Filed: May 13, 2008

(65) Prior Publication Data

US 2008/0283155 A1  Nov. 20, 2008

Related U.S. Application Data

(60) Provisional application No. 60/938,284, filed on May 16, 2007.

(51) Int. Cl.
*C23C 22/70* (2006.01)
*C23C 22/03* (2006.01)
*C23C 22/00* (2006.01)

(52) U.S. Cl. ............. 148/253; 148/242; 106/14.05; 106/14.12; 106/14.26; 106/14.44

(58) Field of Classification Search .............. 148/242, 148/253; 106/14.05, 14.12, 14.26, 14.44
See application file for complete search history.

(56) References Cited

U.S. PATENT DOCUMENTS

| | | |
|---|---|---|
| 3,271,196 A | 9/1966 | Oswin |
| 3,508,967 A | 4/1970 | Lyall et al. |
| 4,615,959 A | 10/1986 | Hayashi et al. |
| 4,668,595 A | 5/1987 | Yoshino et al. |
| 4,945,014 A | 7/1990 | Miyabayashi et al. |
| 5,153,082 A | 10/1992 | Ogino et al. |
| 5,162,176 A | 11/1992 | Herr et al. |
| 5,286,582 A | 2/1994 | Tahara et al. |
| 5,312,611 A | 5/1994 | Takami et al. |
| 5,312,623 A | 5/1994 | Plichta et al. |
| 5,543,021 A | 8/1996 | Yazami et al. |
| 5,587,256 A | 12/1996 | Wilson et al. |
| 5,595,611 A * | 1/1997 | Boulos et al. ........... 148/259 |
| 5,672,446 A | 9/1997 | Barker et al. |
| 5,707,756 A | 1/1998 | Inoue et al. |
| 5,725,968 A | 3/1998 | Sato et al. |
| 5,753,387 A | 5/1998 | Takami et al. |

(Continued)

FOREIGN PATENT DOCUMENTS

DE  689 10 843  8/1989

(Continued)

OTHER PUBLICATIONS

U.S. Appl. No. 10/760,007, filed Jan. 16, 2004, Gao et al.

(Continued)

*Primary Examiner* — Roy King
*Assistant Examiner* — Lois Zheng
(74) *Attorney, Agent, or Firm* — Myers Bigel Sibley & Sajovec, PA

(57) ABSTRACT

The present invention provides a method for stabilizing lithium metal powder. The method comprises the steps of heating the lithium metal powder to above its melting point to provide molten lithium metal, dispersing the molten lithium metal, and contacting the dispersed molten lithium metal with a phosphorous-containing compound to provide a substantially continuous protective layer of lithium phosphate on the lithium metal powder.

10 Claims, 5 Drawing Sheets

U.S. PATENT DOCUMENTS

| | | | |
|---|---|---|---|
| 5,753,388 | A | 5/1998 | Koksbang et al. |
| 5,789,108 | A | 8/1998 | Chu |
| 5,807,645 | A | 9/1998 | Takeuchi et al. |
| 5,948,569 | A | 9/1999 | Moses et al. |
| 5,951,919 | A | 9/1999 | Hwang et al. |
| 5,958,622 | A | 9/1999 | Kojima et al. |
| 6,068,950 | A | 5/2000 | Gan et al. |
| 6,156,457 | A | 12/2000 | Takami et al. |
| 6,168,885 | B1 | 1/2001 | Narang et al. |
| 6,183,911 | B1 | 2/2001 | Kweon et al. |
| 6,265,110 | B1 | 7/2001 | Rao et al. |
| 6,270,926 | B1 | 8/2001 | Yamashita et al. |
| 6,387,564 | B1 | 5/2002 | Yamashita et al. |
| 6,422,450 | B1 | 7/2002 | Zhou et al. |
| 6,440,610 | B1 | 8/2002 | Sheem et al. |
| 6,465,126 | B1 | 10/2002 | Jannasch et al. |
| 6,528,033 | B1 | 3/2003 | Barker et al. |
| 6,541,156 | B1 | 4/2003 | Fuse et al. |
| 6,706,447 | B2 | 3/2004 | Gao et al. |
| 6,723,470 | B2 | 4/2004 | Barker et al. |
| 6,727,021 | B1 | 4/2004 | Shiota et al. |
| 6,770,397 | B1 | 8/2004 | Maeda et al. |
| 6,884,544 | B2 | 4/2005 | Barker et al. |
| 6,896,706 | B2 | 5/2005 | Lee et al. |
| 6,911,280 | B1 | 6/2005 | De Jonghe et al. |
| 6,924,061 | B1 | 8/2005 | Jow et al. |
| 7,026,074 | B2 | 4/2006 | Chen et al. |
| 7,144,655 | B2 | 12/2006 | Jenson et al. |
| 7,276,314 | B2 | 10/2007 | Gao et al. |
| 2002/0119373 | A1 | 8/2002 | Gao et al. |
| 2003/0072942 | A1 | 4/2003 | Hwang et al. |
| 2003/0099884 | A1 | 5/2003 | Chiang et al. |
| 2004/0002005 | A1 | 1/2004 | Gao et al. |
| 2004/0146784 | A1 | 7/2004 | Gao et al. |
| 2004/0234844 | A1 | 11/2004 | Morris et al. |
| 2005/0095504 | A1 | 5/2005 | Kim et al. |
| 2005/0130043 | A1 | 6/2005 | Gao et al. |
| 2005/0186469 | A1 | 8/2005 | De Jonghe et al. |
| 2007/0015061 | A1 | 1/2007 | Klaassen |
| 2009/0035663 | A1* | 2/2009 | Yakovleva et al. ....... 429/231.95 |

FOREIGN PATENT DOCUMENTS

| | | | |
|---|---|---|---|
| DE | 19532626 | A1 | 3/1996 |
| EP | 0 328 131 | | 8/1989 |
| EP | 0763865 | A1 | 1/1992 |
| EP | 0573266 | A1 | 1/1993 |
| EP | 0601832 | A1 | 7/1993 |
| EP | 0696075 | A2 | 3/1995 |
| EP | 0696075 | A3 | 3/1995 |
| GB | 2383465 | A | 6/2003 |
| JP | 63-13282 | | 1/1988 |
| JP | 4-39859 | | 2/1992 |
| JP | 4-126374 | | 4/1992 |
| JP | 04190555 | | 7/1992 |
| JP | 5-234621 | | 9/1993 |
| JP | 10-117406 | | 5/1998 |
| JP | 10-223259 | | 8/1998 |
| JP | 10-270086 | | 10/1998 |
| JP | 11-025975 | | 1/1999 |
| JP | 2000-67853 | | 3/2000 |
| JP | 2000164210 | A | 6/2000 |
| WO | WO 00/13249 | | 3/2000 |
| WO | WO 2006/000833 | A2 | 1/2006 |
| WO | WO 2007/005983 | A2 | 1/2007 |
| WO | WO 2008/045557 | A1 | 4/2008 |

OTHER PUBLICATIONS

U.S. Appl. No. 10/324,611, filed Dec. 20, 2002, Gao et al.

Notification of Transmittal of the International Search Report and the Written Opinion of the International Searching Authority, or the Declaration, PCT/US2004/24502, Dec. 7, 2004.

Notice to Submit Response to the Examination Report corresponding to Korean Patent Application No. 10-2002-0023709 mailed Sep. 28, 2006.

European Search Report corresponding to Great Britain application No. GB 0209424.1; Date of Mailing: Jul. 11, 2002.

Search and Examination Report corresponding to Great Britain Application No. GB0703754.2 dated Jun. 22, 2007.

Huang et al. "Electrochemical characteristics of $Sn_{1-x}Si_xO_2$ as anode for lithium-ion batteries" *J. of Power Sources* 81-82:362-367 (1999).

"WordNet Search", WordNet. Mar. 20, 2008 http://wordnet.princeton.edu.

International Programme on Chemical Safety, n-Hexane Data Sheet 0279, Apr. 2000.

"Microencapsulation of Lithium", *U.S. Dept. of Commerce National Technical Information Service* (Dec. 31, 1985) 68 pages.

Kwon et al. "Characteristics of a lithium-polymer battery based on a lithium powder anode", *J. of Power Sources* 93:145-150 (2001).

Shi et al. "Nano-SnSb alloy deposited on MCMB as an anode material for lithium ion batteries", *J. Mater. Chem.* 11:1502-1505 (2001).

Canadian Office Action corresponding to Canadian Application No. 2384494 dated Mar. 10, 2009.

Notification of Transmittal of the International Search Report and the Written Opinion of the International Searching Authority, or the Declaration, corresponding to International Application No. PCT/US2008/006126, mailed Sep. 17, 2008.

* cited by examiner

STABILIZED LITHIUM METAL POWDER FOR LI-ION APPLICATION, COMPOSITION AND PROCESS

CROSS REFERENCE TO RELATED APPLICATIONS

This application claims priority to U.S. Provisional Application Ser. No. 60/938,284, filed May 16, 2007, the disclosure of which is incorporated herein by reference in its entirety.

FIELD OF THE INVENTION

The present invention relates to stabilized lithium metal powder ("SLMP") having better stability and a longer storage life. Such improved SLMP can be used in a wide variety of applications including organo-metal and polymer synthesis, rechargeable lithium batteries, and rechargeable lithium ion batteries.

BACKGROUND OF THE INVENTION

The highly reactive, i.e., pyrophoric, nature of lithium metal, particularly high surface area lithium metal powder, can be a deterrent for its use in a variety of applications. Thus lithium metal is typically in a stabilized form. It is known to stabilize lithium metal powder by passivating the metal powder surface with $CO_2$ such as described in U.S. Pat. Nos. 5,567,474, 5,776,369, and 5,976,403, the disclosures of which are incorporated herein in their entireties by reference. The $CO_2$ passivated lithium metal powder, however, can be used only in air with low moisture levels for a limited period of time before the lithium metal content decays because of the reaction of the lithium metal and air.

Another option has been to coat the lithium powder with a protective layer. For example, U.S. Pat. No. 6,911,280B1 proposes coating with an alkali or alkaline earth metal carbonate. U.S. Pat. No. 4,503,088 proposes coating an epoxy resin on a lithium negative electrode as a passivation layer. U.S. Pat. Nos. 5,342,710 and 5,487,959 propose using a complex of $I_2$ and poly-2-vinylpyridine as a passivation layer. These suggested protective layers; however, often result in a decrease in conductivity and weak mechanical strength.

SUMMARY OF THE INVENTION

The present invention provides a method for stabilizing lithium metal powder. The method comprises the steps of heating the lithium metal powder to above its melting point to provide molten lithium metal, dispersing the molten lithium metal, and contacting the dispersed molten lithium metal with a phosphorous-containing compound such as phosphoric acid to provide a substantially continuous protective layer of lithium phosphate on the lithium metal powder.

DETAILED DESCRIPTION OF THE INVENTION

Figure 1:
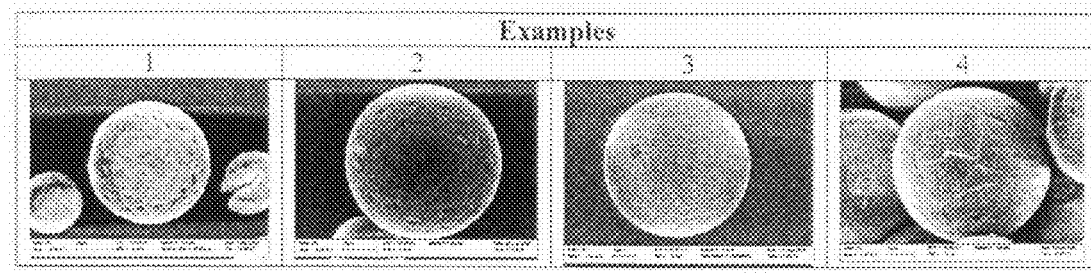
FIG. 1 is a comparison of SEM images for stabilized lithium powder prepared according to Examples 1-4.

In the drawings and the following detailed description, various embodiments are described in detail to enable practice of the invention. Although the invention is described with reference to these specific embodiments, it will be understood that the invention is not limited to these embodiments. But to the contrary, the invention includes numerous alternatives, modifications and equivalents as will become apparent from consideration of the following detailed description and accompanying drawing.

The terminology used herein is for the purpose of describing particular embodiments only and is not intended to be limiting of the invention. As used herein, the term "and/or" includes any and all combinations of one or more of the associated listed items. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, the term "about," as used herein when referring to a measurable value such as an amount of a compound or agent of this invention, dose, time, temperature, and the like, is meant to encompass variations of 20%, 10%, 5%, 1%, 0.5%, or even 0.1% of the specified amount.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All publications, patent applications, patents, and other references mentioned herein are incorporated by reference in their entirety. However, the citation of a reference herein should not be construed as an acknowledgement that such reference is prior art to the present invention described herein.

The present invention relates to a method of providing stable lithium metal powder. The method includes the step of heating lithium metal powder to above its melting point in an inert atmosphere. Typically this is above about 200° C. Often this is done by heating a non-combustible hydrocarbon oil. Exemplary hydrocarbon oils include mineral oil, or any other saturated hydrocarbon solvent having a branched, straight chain or saturated cyclic structures and a flash point above about 200° F. A variety of hydrocarbon oils may be used in the present invention. The term hydrocarbon oil, as used herein, includes various oily liquids consisting chiefly or wholly of mixtures of hydrocarbons and includes mineral oils, i.e., liquid products of mineral origin having viscosity limits recognized for oils and hence includes but is not limited to petroleum, shale oils, paraffin oils and the like. There are many manufacturers of these useful hydrocarbon oils. Among these useful hydrocarbon oils are highly refined oils, such as, Peneteck manufactured by Penreco Division of Pennzoil Products Inc., which has a viscosity in the range of 43-59 pascal-sec at 100° F. and a flash point of 265° F., Parol 100, which has a viscosity of 213-236 pascal-sec at 100° F. and a flash point of 360° F. (available from Penreco, Div. of Pennzoil Products), and Carnation white oil (viscosity=133-165 pascal-sec at 100° F.) made by Sonneborn Div. of Witco. Even certain purified hydrocarbon solvents which boil in a range encompassing the melting point of lithium may be used, such as UNOCAL's 140 Solvent. In addition, unrefined oils, such as Unocal's 460 Solvent and Hydrocarbon Seal oil and Exxon's Telura 401 and Telura 407 may also be used. The selection of a hydrocarbon oil will be within the skill of one in the art.

The molten lithium metal is then dispersed such as by agitating or stirring vigorously to apply high sheer forces. The dispersion step using high sheer or other equivalent forces is conducted to form uniform droplets or particles of the lithium metal, and to facilitate distributing the droplets or particles in the hydrocarbon oil while avoiding agglomeration.

The dispersed molten lithium is contacted with a phosphorous-containing compound such as phosphoric acid ($H_3PO_4$) to provide a substantially continuous protective layer of lithium phosphate ($Li_3PO_4$) on the lithium metal powder. Other phosphorous-containing compounds can be used, particularly if phosphoric acid is formed during its reaction with the lithium. For example, $P_2O_5$ can be used if reacted in the presence of moisture so that $H_3PO_4$ is formed first and then the $Li_3PO_4$ is formed. Alternatively $POF_3$ gas could be hydrolyzed into HF and $H_3PO_4$ which then reacts with lithium to form $Li_3PO_4$.

The phosphorous-containing compound can be introduced to contact the lithium droplets during the dispersion at a temperature above the lithium melting point, or at a lower temperature after the lithium dispersion has cooled. The phosphorous-containing compound could be introduced in a crystalline form or in a solution form in mineral oil or any other suitable solvent. It is understood that combinations of different process parameters could be used to achieve specific coating characteristics. For example, control of reaction rate between lithium and the phosphorous-containing compound is essential in preventing cavities and or cracks being formed. Furthermore, it is beneficial to combine the coating with an organic coating, for example, different types of waxes with different chemical compositions, molecular weights, melting points and hardness could be used to achieve specific coating characteristics for particular applications and the like, to improve both air stability and polar solvent stability that would allow both safer handling and possibility of using commonly used polar solvents that dissolve commonly used polymer binders.

Suitable waxes can be natural wax such as 12-hydroxystearic acid, synthetic wax such as low molecular weight polyethylene, petroleum waxes such as paraffin wax, and microcrystalline waxes. The wax can be introduced to contact the lithium droplets during the dispersion, or at a lower temperature after the lithium dispersion has cooled. It is understood that combinations of different types of waxes with different chemical compositions, molecular weights, melting points and hardness could be used to achieve specific coating characteristics for particular applications. For example, degree of stickiness could be controlled to allow introduction of the SLMP using a "transfer release paper" concept, wherein a certain degree of stickiness is required.

Suitable waxes described above could produce two types of coatings on lithium particles: first type representing physical or adhesive type where non-polar waxes are used and a second type, representing chemically bonded coatings where waxes with functional groups, having both hydrophobic and hydrophilic features, are used. The coating thickness could vary in the range of about 20 nm to about 200 nm.

The present invention also provides a lithium metal powder protected by $Li_3PO_4$. A thin, dense, substantively continuous $Li_3PO_4$ layer of the invention provides improved protection such as compared to typical $CO_2$ and LiF passivation techniques. The lithium phosphate layer may comprise about 0.5% to 20% by weight of the stabilized lithium metal powder. This range is estimated based on a 45 micron particle: 0.01 micron coating corresponds to 0.74% $Li_3PO_4$ and 0.3 micron coating corresponds to 18.6% $Li_3PO_4$. The resulting lithium metal powder has improved stability and improved storage life. To this end, a more stable lithium metal powder is provided. The lithium metal powder is passivated by $H_3PO_4$. Such a thin, dense, continuous $Li_3PO_4$ layer provides better passivation as compared to $CO_2$ and LiF because of the insolubility of $Li_3PO_4$ in water (i.e., 0.04 g in 100 g $H_2O$ at 25° C.) vs. LiF (i.e., 0.133 g in 100 g $H_2O$ at 25° C.) and $Li_2CO_3$ (i.e., 1.29 g in 100 g $H_2O$ at 25° C.). The $Li_3PO_4$ passivation layer serves as a better barrier against moisture and atmosphere gases.

The following examples are merely illustrative of the invention, and are not limiting thereon.

EXAMPLES

Example 1

Battery grade lithium metal (411 grams) was cut into 2×2 inch pieces and charged under constant flow of dry argon at room temperature to a 3 liter stainless steel flask reactor with a 4" top fitted with a stirring shaft connected to a fixed high speed stirrer motor. The reactor was equipped with top and bottom heating mantles. The reactor was assembled and 1078 g of Peneteck™ oil were added. The reactor was then heated to about 200° C. and gentle stirring was maintained in the range of 250 rpm to 800 rpm to ensure all metal was molten. Then the mixture was stirred at high speed (up to 10,000 rpm) for 2 minutes. Oleic acid, 8.22 g was charged into the reactor and high speed stirring continued for another 3 minutes. Then the high speed stirring was stopped, the heating mantles were removed and the dispersion was allowed to cool to about 46° C. Next, 21.4 grams of phosphoric acid melted in advance in 68.59 grams of oil was charged into the reactor while stirring at about 800 rpm, the temperature rise of 2° C. was noted. The dispersion was stirred for another 10 minutes and then transferred to the storage bottles. Further, lithium dispersion was filtered and washed three times with hexane in an enclosed, sintered glass filter funnel and once with n-pentane to remove the hydrocarbon oil medium. The funnel was heated with a heat gun to remove traces of the solvents and the resulting free-flowing powder was transferred to tightly capped storage bottles.

Example 2

1102 g of non-stabilized lithium dispersion in oil (11.3%) that contained 124.5 g of lithium with a medium particle size of 45 micron was charged under constant flow of dry argon at room temperature to a 2 liter three neck glass flask reactor fitted with a stirring shaft connected to a fixed high speed stirrer motor. 7.81 g of phosphoric acid (Aldrich) in a form of a 2 phase solution in 8 g of mineral oil at 21° C. was charged into the reactor. Temperature rise of 4° C. was noted along with significant foaming and stirring continued for another hour and then transferred to the storage bottles. Further, lithium dispersion was filtered and washed three times with hexane in an enclosed, sintered glass filter funnel and twice with n-pentane to remove the hydrocarbon oil medium. The funnel was heated with a heat gun to remove traces of the solvents and the resulting free-flowing powder was transferred to a tightly capped storage bottles.

Example 3

1128.5 g of non-stabilized lithium dispersion in oil (11.2%) that contained 126.4 g of lithium with a medium particle size of 63 micron was charged under constant flow of dry argon at room temperature to a 5 liter three neck glass flask reactor fitted with a stirring shaft connected to a fixed high speed stirrer motor. 7.81 g of phosphoric acid (Aldrich) in a form of a 2 phase solution in 8 g of mineral oil at 20° C. was charged into the reactor drop-wise over the period of 6 minutes; higher agitation than in example 2 was used. Temperature rise of 4.5° C. was noted within 20 minutes, no foaming was observed, and stirring continued for another 5 hours and then transferred to the storage bottles. Further, lithium dispersion was filtered and washed three times with hexane in an enclosed, sintered glass filter funnel and twice with n-pentane to remove the hydrocarbon oil medium. The funnel was heated with a heat gun to remove traces of the solvents and the resulting free-flowing powder was transferred to a tightly capped storage bottles.

Example 4

55.00 grams of non-stabilized lithium dispersion in oil (11.275%) containing 6.20 grams of lithium with a medium particle size of 63 micron was charged into 120 ml hastelloy can equipped with a 1" Teflon coated stir bar. The solution was heated to 200° C. and 0.4 g Anhydrous $H_3PO_4$ previously melted in 2 ml of mineral oil was added to the lithium dispersion. This mixture was continuously stirred at 200 rpm for 30 minutes while holding the temperature at 200° C. Sample was allowed to cool to the room temperature and transferred to the storage bottle. Further, lithium dispersion was filtered and washed three times with hexane in an enclosed, sintered glass filter funnel and twice with n-pentane to remove the hydrocarbon oil medium. The funnel was heated with a heat gun to remove traces of the solvents and the resulting free-flowing powder was transferred to a tightly capped storage bottles.

FIG. 1 demonstrates that process parameters affect the quality of the coating. From left to right: amount of cavities/cracks reduced providing better hermeticity for the Li particle. Example 4 represents liquid/liquid reaction interface and is believed to provide even better protection: passivating layer is like a crust of microcrystalline $Li_3PO_4$. Adding, for example wax, will ensure that all the porosity, cracks, cavities are protected against moisture and atmospheric gases.

Example 5

52.3 grams of lithium dispersion in oil (12.0%), produced in example 1, containing 6.3 grams of lithium with a median particle size of 31 micron was charged into 120 ml hastelloy can equipped with a 1" Teflon coated stir bar. 0.34 g of LuwaxS dry powder was also added to the can. The mixture was heated from ambient temperature to 75° C. at a rate of 5° C./min and held for 10 minutes. The sample was further heated from 75° C. to 175° C. at 5° C./min and held for one hour. Finally the mixture was heated from 175° C. to 190° C. at a rate of 20° C./min followed by slow cooling to ambient temperature. This mixture was continuously stirred at 200 rpm during the heating phase. Following cooling to the room temperature the sample was transferred to a glass storage bottle. Further, the lithium dispersion was filtered and washed three times with hexane in an enclosed, sintered glass filter funnel and twice with n-pentane to remove the hydrocarbon oil medium. The funnel was heated with a heat gun to remove traces of the solvents and the resulting free-flowing powder was transferred to a tightly capped storage bottles.

Figure 2:
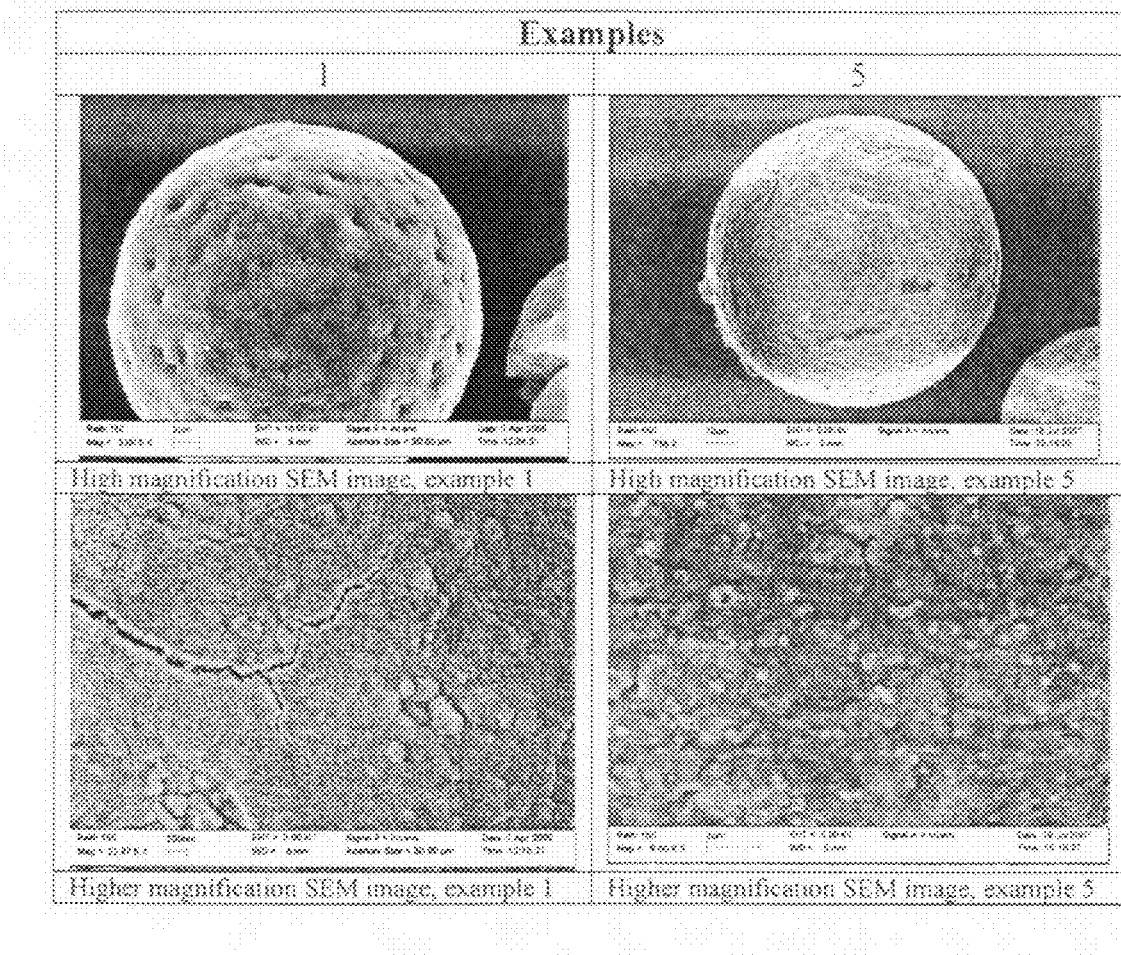
FIG. 2 is a comparison of SEM images for stabilized lithium powder prepared according to Examples 1 and 5.

FIG. 2 illustrates a comparison of SEM images for Example 1 and Example 5, and demonstrate the effect of a multi-coating approach.

Comparative Example 1

Battery grade lithium metal 441 grams was cut into 2×2 inch pieces and charged under constant flow of dry argon at room temperature to a 3 liter stainless steel flask reactor with a 4" top fitted with a stirring shaft connected to a fixed high speed stirrer motor. The reactor was equipped with top and bottom heating mantles. The reactor was then assembled and 1215 g of Peneteck™ oil (Penreco, Division of the Penzoil products Company) were added. The reactor was then heated to about 200° C. and gentle stirring was maintained in the range of 250 rpm to 800 rpm to ensure all metal was molten. Then the mixture was stirred at high speed (up to 10,000 rpm) for 2 minutes. Oleic acid, 4.41 g was charged into the reactor and high speed stirring continued for another 3 minutes. Then the high speed stirring was stopped, heating mantles removed and dispersion was allowed to cool to about 100° C. at which point 32.6 grams of fluorinating agent FC70 (perfluoropentylamine) was charged into the reactor while stirring at about 800 rpm until cooled to about 45° C. and transferred to the storage bottles. Further, lithium dispersion was filtered and washed three times with hexane in an enclosed, sintered glass filter funnel and once with n-pentane to remove the hydrocarbon oil medium. The funnel was heated with a heat gun to remove traces of the solvents and the resulting free-flowing powder was transferred to a tightly capped storage bottles.

Comparative Example 2

Battery grade lithium metal 441 grams was cut into 2×2 inch pieces and charged under constant flow of dry argon at room temperature to a 3 liter stainless steel flask reactor with a 4" top fitted with a stirring shaft connected to a fixed high speed stirrer motor. The reactor was equipped with top and bottom heating mantles. The reactor was then assembled and 1215 g of Peneteck™ oil (Penreco, Division of the Penzoil products Company) were added. The reactor was then heated to about 200° C. and gentle stirring was maintained in the range of 250 rpm to 800 rpm to ensure all metal was molten. Then the mixture was stirred at high speed (up to 10,000 rpm) for 2 minutes. Oleic acid, 4.41 g was charged into the reactor and high speed stirring continued for another 3 minutes. Then the high speed stirring was stopped, heating mantles removed and dispersion was allowed to cool to about 100° C. at which point 32.6 grams of fluorinating agent FC70 (perfluoropentylamine) was charged into the reactor while stirring at about 800 rpm until cooled to about 45° C. and transferred to the storage bottles. Further, lithium dispersion was filtered and washed three times with hexane in an enclosed, sintered glass filter funnel and once with n-pentane to remove the hydrocarbon oil medium. The funnel was heated with a heat gun to remove traces of the solvents and the resulting free-flowing powder was transferred to a tightly capped storage bottles. Physical properties for Examples 1-4 and Comparative Examples 1 and 2 are provided in Table 1. The table is shown that the physical properties demonstrate that the properties are similar and there is no surface area effect.

Figure 3:
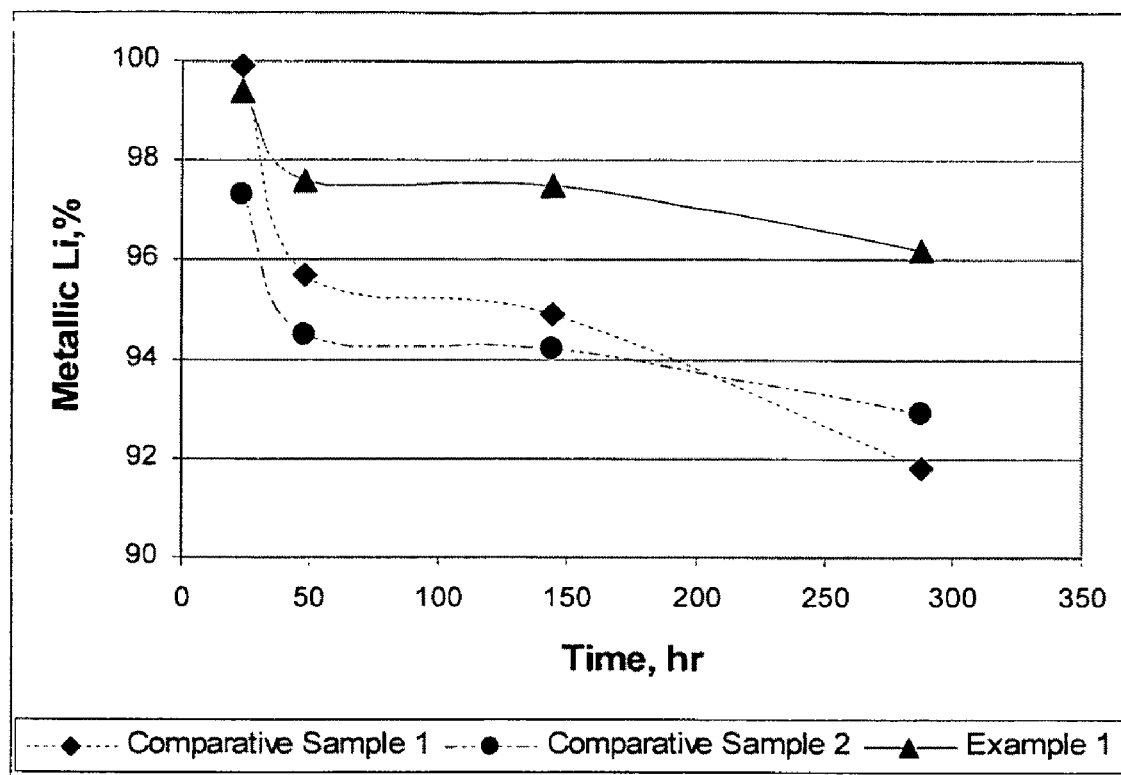
FIG. 3 is an air stability comparison of Comparative Example 1, Comparative Example 2, and Example 1.

Referring to FIG. 3, in the standard air stability test, Example 1 clearly retained more metallic lithium. Lithium metal powder is spread in a thin layer in the Petri dishes and exposed to certain moisture/temperature conditions. Metallic lithium concentration is monitored, the more metallic lithium is retained, the better the stability of the sample is.

TABLE 1

Comparison of Physical Properties

|  | Coating Type | D50, micron | Calculated SA, m2/g |
| --- | --- | --- | --- |
| Comparative Sample 1 | $Li_2CO_3$ | 32 | 0.22 |
| Comparative Sample 2 | LIF | 34 | 0.19 |
| Example 1 | $Li_3PO_4$ | 31 | 0.20 |
| Example 2 | $Li_3PO_4$ | 45 | 0.14 |
| Example 3 | $Li_3PO_4$ | 65 | 0.11 |
| Example 4 | $Li_3PO_4$ | 63 | 0.11 |

Figure 4:
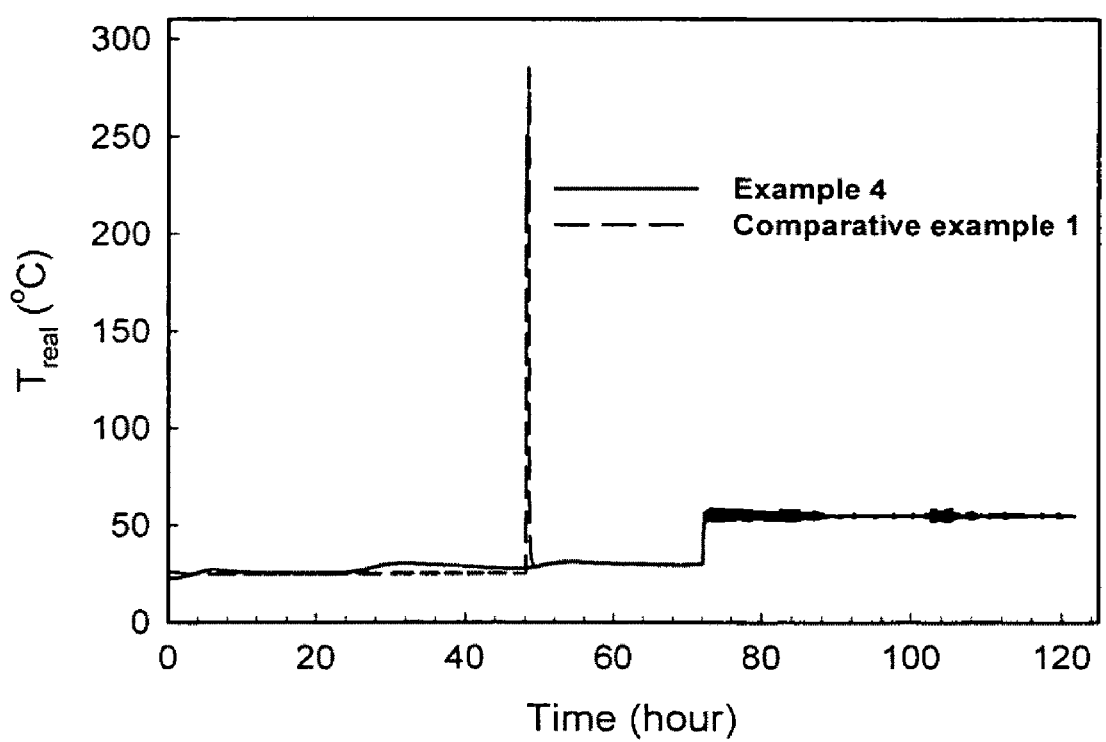
FIG. 4 is an Advanced Reactive Screening Tool Colorimeter (ARSST) Test comparing the stability of Comparative Example 1 and Example 4.

Referring to FIG. 4, there is a comparison of the stability of Example 4 and comparative example 1 in 0.6% water doped NMP is provided. This test shows that while $CO_2$-coated SLMP exhibits runaway reaction at about 48 hours of exposure to the solvent doped with moisture, the SLMP produced according to the invention of example 4 has significantly improved tolerance to moist NMP. The Example 4 SLMP does not have runaway reaction when exposed to room temperature for 72 hours and when exposed to 55° C. for about 30 hours.

Figure 5:
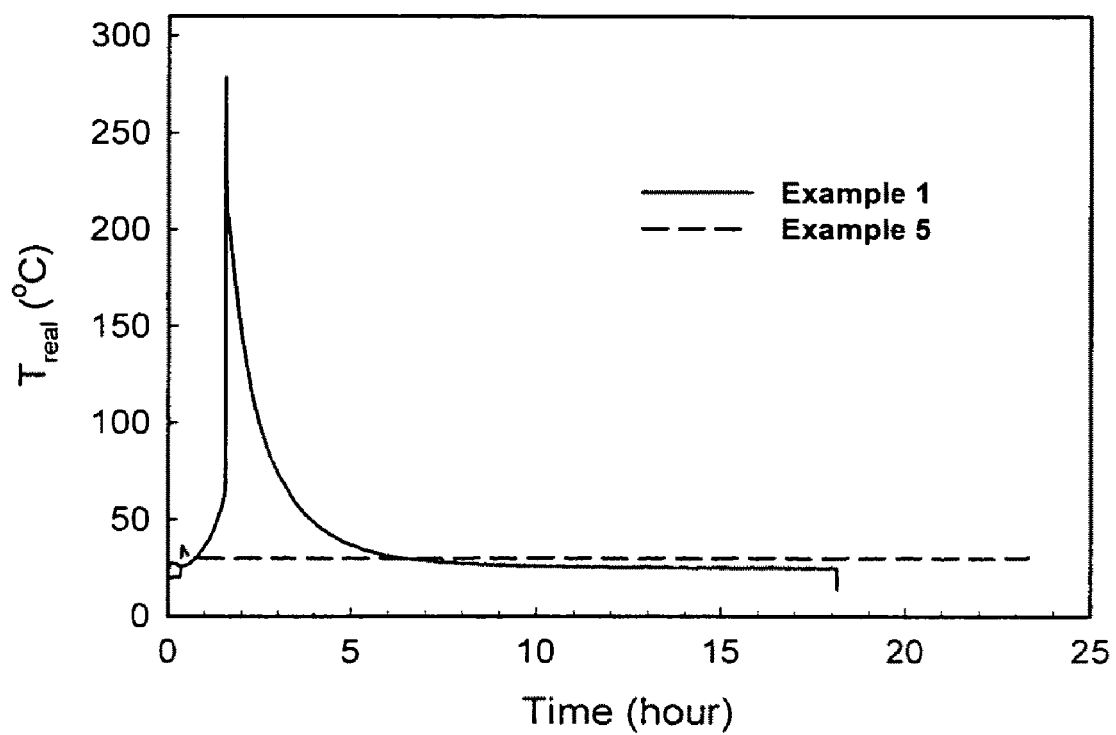
FIG. 5 is a Vent Sizing Package 2 (VSP2) test comparing the stability of Example 1 and Example 5 in NMP.

Referring to FIG. 5, a comparison of the stability of samples produced according to Example 1 and Example 5 in NMP is provided. Test shows immediate runaway was observed for the reaction system containing Example 1 sample while no runaway reaction was observed for the system containing the Example 5 sample. The test was conducted at 30° C. for 24 hours.

Having thus described certain embodiments of the present invention, it is to be understood that the invention defined by the appended claims is not to be limited by particular details set forth in the above description as many apparent variations thereof are possible without departing from the spirit or scope thereof as hereinafter claimed.

That which is claimed:

1. A method of providing a stable lithium metal powder comprising the steps of:
    a) heating lithium metal powder to above its melting point to provide molten lithium metal;
    b) dispersing the molten lithium metal; and
    c) contacting the dispersed molten lithium metal with a phosphorous-containing compound to provide a substantially continuous protective layer of lithium phosphate on the lithium metal powder.

2. The method according to claim 1, wherein the step of heating the lithium metal is conducted in a hydrocarbon oil.

3. The method according to claim 2, wherein the hydrocarbon oil is selected from the group consisting of mineral oil, petroleum oil, shale oils, and highly refined oils.

4. The method according to claim 1, wherein the step (c) of contacting the dispersed molten lithium metal with a phosphorous-containing compound is conducted during step (b) of dispersing the molten lithium metal.

5. The method according to claim 1, wherein the dispersed molten lithium metal of step (b) is cooled prior to step (c).

6. A method of providing a stable lithium metal powder comprising the steps of:
    a) heating lithium metal powder to above its melting point to provide molten lithium metal;
    b) dispersing the molten lithium metal; and
    c) contacting the dispersed molten lithium metal with a phosphoric acid to provide a substantially continuous protective layer of lithium phosphate on the lithium metal powder.

7. The method according to claim 6, wherein the step of heating the lithium metal is conducted in a hydrocarbon oil.

8. The method according to claim 7, wherein the hydrocarbon oil is selected from the group consisting of mineral oil, petroleum oil, shale oils, and highly refined oils.

9. The method according to claim 6, wherein the step (c) of contacting the dispersed molten lithium metal with a phosphoric acid is conducted during step (b) of dispersing the molten lithium metal.

10. The method according to claim 6, wherein the dispersed molten lithium metal of step (b) is cooled prior to step (c).

* * * * *